US011762653B2

(12) United States Patent
Dai

(10) Patent No.: US 11,762,653 B2
(45) Date of Patent: Sep. 19, 2023

(54) METHOD AND APPARATUS FOR REMOTELY UPDATING FIRMWARE IN BATCHES, AND COMPUTER-READABLE STORAGE MEDIUM

(71) Applicant: INSPUR ELECTRONIC INFORMATION INDUSTRY CO., LTD., Shandong (CN)

(72) Inventor: Mingfu Dai, Shandong (CN)

(73) Assignee: INSPUR ELECTRONIC INFORMATION INDUSTRY CO., LTD., Shandong (CN)

( * ) Notice: Subject to any disclaimer, the term of this patent is extended or adjusted under 35 U.S.C. 154(b) by 0 days.

(21) Appl. No.: 17/928,639

(22) PCT Filed: Feb. 19, 2021

(86) PCT No.: PCT/CN2021/076933
§ 371 (c)(1),
(2) Date: Nov. 30, 2022

(87) PCT Pub. No.: WO2021/253854
PCT Pub. Date: Dec. 23, 2021

(65) Prior Publication Data
US 2023/0185562 A1 Jun. 15, 2023

(30) Foreign Application Priority Data
Jun. 19, 2020 (CN) .......................... 202010567680.0

(51) Int. Cl.
*G06F 8/65* (2018.01)
*H04L 61/5014* (2022.01)
*H04L 41/082* (2022.01)

(52) U.S. Cl.
CPC .............. *G06F 8/65* (2013.01); *H04L 41/082* (2013.01); *H04L 61/5014* (2022.05)

(58) Field of Classification Search
USPC ........................................................ 717/168
See application file for complete search history.

(56) References Cited

U.S. PATENT DOCUMENTS

| 7,418,488 B1 | 8/2008 | Amin et al. | |
| 8,725,681 B1 * | 5/2014 | Bailey | G06F 16/285 |
| | | | 707/769 |

(Continued)

FOREIGN PATENT DOCUMENTS

| CN | 1689310 A | 10/2005 |
| CN | 103377061 A | 10/2013 |

(Continued)

OTHER PUBLICATIONS

Corresponding International Patent Application No. PCT/CN2021/076933, International Search Report, dated May 19, 2021.

(Continued)

*Primary Examiner* — Qing Chen
*Assistant Examiner* — Clint Thatcher
(74) *Attorney, Agent, or Firm* — COOPER LEGAL GROUP, LLC

(57) ABSTRACT

A method and apparatus for remotely updating firmware in batches, and a computer-readable storage medium. Wherein the method is applied to a DHCP server connected with a Baseboard Management Controllers (BMC) of each server node. The DHCP server assigns IP addresses to each server node in advance, and records a BMC MAC address of each server node at the same time. When detecting that a firmware version to be matched stored in itself is updated, authorized server nodes and corresponding BMC IP addresses are determined on the basis of each BMC MAC address and authorization state. The firmware version of the corresponding authorized server nodes is read according to the BMC IP address of each authorized server, and a plurality of servers to be upgraded is determined by comparing the firmware (Continued)

version of each authorized server node with the firmware version to be matched.

20 Claims, 3 Drawing Sheets

(56) References Cited

U.S. PATENT DOCUMENTS

| | | | | |
|---|---|---|---|---|
| 11,483,283 | B1* | 10/2022 | Choukir | ............... H04W 8/005 |
| 2003/0177208 | A1 | 9/2003 | Harvey | |
| 2007/0097869 | A1 | 5/2007 | Wang et al. | |
| 2008/0021985 | A1 | 1/2008 | Belgaied et al. | |
| 2011/0029645 | A1* | 2/2011 | Baykal | ............... H04L 61/5046 |
| | | | | 709/221 |
| 2011/0030032 | A1* | 2/2011 | Baykal | .................. H04L 63/164 |
| | | | | 726/3 |
| 2012/0124242 | A1* | 5/2012 | Chen | ....................... H04L 67/06 |
| | | | | 709/250 |
| 2013/0067062 | A1* | 3/2013 | Gaitonde | ................ H04L 43/04 |
| | | | | 709/224 |
| 2016/0072761 | A1* | 3/2016 | Shih | .................... H04L 61/5014 |
| | | | | 709/220 |
| 2016/0381155 | A1 | 12/2016 | Pan et al. | |
| 2017/0149931 | A1* | 5/2017 | Lochhead | ........... H04L 41/5009 |
| 2018/0329862 | A1 | 11/2018 | Cao et al. | |
| 2018/0357193 | A1* | 12/2018 | Zhan | ..................... G06F 13/385 |
| 2021/0157698 | A1* | 5/2021 | Song | .................. G06F 11/2221 |

FOREIGN PATENT DOCUMENTS

| | | |
|---|---|---|
| CN | 103580921 A | 2/2014 |
| CN | 104346188 A | 2/2015 |
| CN | 106445580 A | 2/2017 |
| CN | 106681766 A | 5/2017 |
| CN | 107423081 A | 12/2017 |
| CN | 108512684 A | 9/2018 |
| CN | 109324812 A | 2/2019 |
| CN | 110895477 A | 3/2020 |
| CN | 110943860 A | 3/2020 |
| CN | 111130865 A | 5/2020 |
| CN | 111756574 A | 10/2020 |
| WO | 2017190547 A | 11/2017 |

OTHER PUBLICATIONS

Corresponding International Patent Application No. PCT/CN2021/076933, Written Opinion, dated May 19, 2021. English Translation.
Corresponding Chinese Patent Application No. 202010567680.0, First Office Action dated Sep. 15, 2021. English Translation.
Corresponding Chinese Patent Application No. CN202010567680.0 International Search Report, dated Mar. 23, 2023.

* cited by examiner

US 11,762,653 B2

METHOD AND APPARATUS FOR REMOTELY UPDATING FIRMWARE IN BATCHES, AND COMPUTER-READABLE STORAGE MEDIUM

This application claims priority to Chinese Patent Application No. 202010567680.0, filed on Jun. 19, 2020, in China National Intellectual Property Administration and entitled "Method and Apparatus for Remotely Updating Firmware in Batches, and Computer-Readable Storage Medium", the contents of which are hereby incorporated by reference in its entirety.

FIELD

The present application relates to the technical field of computers, in particular to a method and apparatus for remotely updating firmware in batches, and a computer-readable storage medium.

BACKGROUND

With the wide application of the Internet in various industries, such as laboratories, machine rooms and data centers, there are more and more application environments where a large number of servers are deployed. It is understandable that firmware deployed in servers such as a Baseboard Management Controller (BMC) and a Power Supply Unit (PSU) may be updated irregularly, for example, Basic Input Output System (BIOS) version of the servers may be updated.

Along with the increase in the number of server nodes, once the BIOS version changes, operation problems for uploading and updating a large batch of firmware in the server nodes will be involved. Generally, a related technology is such as to manually search for BMC Internet Protocol (IP) addresses of the servers, then log in to BMC Web interfaces on the basis of the obtained BMC IP addresses for uploading BIOS images, and finally update BIOSs. The method for manual upgrading firmware machine by machine is time-consuming, labor-intensive, extremely inconvenient, and hardly meets the requirements of convenient and rapid operation and maintenance at the current stage. It can be shown that current BIOS-based software upgrading is kept at the level of machine-by-machine upgrading, such as installation of the BIOSs and BMC WEB operations. Batch upgrading can only be performed under the condition that the BMC IPs have been configured or known. Remote batch upgrading of the firmware may be greatly limited by the upgrading requirement or updating requirement.

In view of this, how to achieve automatic firmware upgrading without manual intervention in firmware updating and limitation to BMC IP requirements is a technical problem to be solved by those skilled in the art.

SUMMARY

The present application provides a method and apparatus for remotely updating firmware in batches, and a computer-readable storage medium, automatic batch updating and upgrading of server firmware are realized, the whole updating process does not require manual intervention, BMC IPs do not need to be known in advance, and operation is simple and easy to implement.

In order to solve the above technical problems, an embodiment of the present application provides the following technical solution:

On one hand, embodiments of the present application provide a method for remotely updating firmware in batches, which is applied to a DHCP server connected with BMC of each server node, and comprises:

assigning IP addresses to each server node in advance, and recording a BMC MAC address of each server node at the same time;

when detecting that a firmware version to be matched stored in itself is updated, determining authorized server nodes and corresponding BMC IP addresses on the basis of each BMC MAC address and authorization state;

reading the firmware version of the corresponding authorized server nodes according to the BMC IP address of each authorized server, and comparing the firmware version of each authorized server node with the firmware version to be matched to determine a plurality of servers to be upgraded;

updating the firmware version of each server to be upgraded in batches according to the BMC IP address of each server to be upgraded and the firmware version to be matched.

Optionally, the determining authorized server nodes and corresponding BMC IP addresses on the basis of each BMC MAC address and authorization state includes:

setting a state code in the MAC IP address of each server node in advance, the state code indicating that the DHCP server is authorized to process service of the server node;

acquiring the IP address file storing the assigned IP address information of each server node;

for each server node, reading the BMC IP address of a current server node from the IP address file based on the BMC MAC address of the current server node;

if the state code of the BMC IP address of the current server node is an authorized state, the current server node being an authorized server node; and if the state code of the BMC IP address of the current server node is an unauthorized state, the current server node not being the authorized server node.

Optionally, the for each server node, reading the BMC IP address of a current server node from the IP address file based on the BMC MAC address of the current server node includes:

calling a plurality of address reading threads, and selecting the same number of target server nodes as the address reading threads;

simultaneously reading the BMC IP addresses of the corresponding target server nodes from the IP address file based on the BMC MAC addresses of each server node and by means of each address reading thread.

Optionally, the detecting that a firmware version to be matched stored in itself is updated includes:

if a current moment is a preset detection period arrival moment, reading an image name of a current firmware version in a firmware version storage file;

if the mirror name is different from a mirror name read last time, outputting prompt information of firmware version updating, and taking the current firmware version as the firmware version to be matched.

Optionally, the detecting that a firmware version to be matched stored in itself is updated includes:

when detecting that a system is started, reading an image name of a current firmware version in a firmware version storage file; and if the mirror name is different from a mirror name read last time, outputting prompt information of firmware version updating, and taking the current firmware version as the firmware version to be matched.

Optionally, the updating the firmware version of each server to be upgraded in batches according to the BMC IP address of each server to be upgraded and the firmware version to be matched includes:

sending an instruction of firmware version updating to each server to be upgraded, and determining candidate servers to be upgraded which receive an updating operation executing request within a preset time period;

acquiring priority information of each candidate server to be upgraded;

sequentially performing firmware version updating on each candidate server to be upgraded in order from high to low according to the priority, based on the BMC IP address of each candidate server to be upgraded and the firmware version to be matched.

On another hand, embodiments of the present application provide a apparatus for remotely updating firmware in batches, which is applied to a DHCP server connected with BMC of each server node, and comprises:

an IP address assigning module, configured to assign IP addresses to each server node in advance;

a MAC address recording module, configured to record the BMC MAC address of each server node;

a server IP address determining module, configured to determine authorized server nodes and corresponding BMC IP addresses on the basis of each BMC MAC address and authorization state, when detecting that a firmware version to be matched stored in itself is updated;

a version detection module, configured to read the firmware version of the corresponding authorized server nodes according to the BMC IP address of each authorized server, and compare the firmware version of each authorized server node with the firmware version to be matched to determine a plurality of servers to be upgraded;

a batch updating module, configured to update the firmware version of each server to be upgraded in batches according to the BMC IP address of each server to be upgraded and the firmware version to be matched.

Optionally, the server IP address determining module comprises:

a state code presetting submodule, configured to set a state code in the MAC IP address of each server node in advance, the state code indicating that the DHCP server is authorized to process service of the server node;

a file acquiring submodule, configured to acquire the IP address file storing the assigned IP address information of each server node;

an IP address reading submodule, configured to, for each server node, read the BMC IP address of a current server node from the IP address file based on the BMC MAC address of the current server node;

an authorized server node determining submodule, configured to, if the state code of the BMC IP address of the current server node is an authorized state, take the current server node an authorized server node; and if the state code of the BMC IP address of the current server node is an unauthorized state, take the current server node as not the authorized server node.

Embodiments of the present application further provide a apparatus for remotely updating firmware in batches, comprising a processor, configured to implement the steps of the method for remotely updating firmware in batches as described in any preceding item when executing a computer program stored in a memory.

Finally, embodiments of the present application further provide a computer-readable storage medium has a program for remotely updating firmware in batches stored thereon, which when executed by a processor, implements the steps of the method for remotely updating firmware in batches as described in any preceding item.

The technical solutions provided by the present application have the advantages: the DHCP server determines the BMC IP addresses of the currently-connected server nodes on the basis of log analysis and according to the feature of the uniqueness of BMC MAC, reads firmware version information of the server nodes through the BMC IP addresses, and automatically compares the firmware version with a firmware version locally stored by the DHCP server to judge whether upgrading is needed, so that automatic batch updating and upgrading of server firmware are realized. The whole updating process does not require manual intervention, BMC IPs do not need to be known in advance, and MAC addresses only need to be recorded once; and it is only needed to update local mirrors of the DHCP server once firmware versions need to be upgraded in the follow-up process, so that operation is simple and easy to implement. It completely liberates the human input, effectively improves the update efficiency of the server cluster firmware version, and reduces the version update cost.

In addition, the embodiments of the present application further provide the corresponding implementing apparatus for the method for remotely updating firmware in batches, and the computer-readable storage medium, so as to further make the method more practical, and the apparatus and the computer-readable storage medium have corresponding advantages.

It should be understood that the above general description and the following detailed description are exemplary only, and are not intended to limit the present application.

BRIEF DESCRIPTION OF THE DRAWINGS

In order to describe the embodiments of the present application or the technical solutions in the related art more clearly, drawings required to be used in the embodiments or the illustration of the related art will be briefly introduced below. Obviously, the drawings in the illustration below are only some embodiments of the present application. Those ordinarily skilled in the art also can acquire other drawings according to the provided drawings without creative work.

DETAILED DESCRIPTION

In order to enable those skilled in the art to better understand the solution of the present application, the present application will be further described in detail below with reference to the accompanying drawings and specific embodiments. Apparently, the described embodiments are only a part of the embodiments of the present application, rather than all the embodiments. Based on the embodiments of the present application, all other embodiments obtained by those skilled in the art without creative work shall fall within the protection scope of the present application.

The terms "first", "second", "third", "fourth", etc. in the specification and claims of the present application and the above drawings are used to distinguish different objects, and are not intended to describe a specific order. In addition, the terms "include" and "comprise" and any variations of them are intended to cover non-exclusive inclusions. For example, a process, method, system, product or apparatus comprising a series of steps or units is not limited to the listed steps or units, but may include unlisted steps or units.

After introducing the technical solutions of the embodiments of the present application, various non-limiting implementations of the present application are described in detail below.

Figures 1, 2:
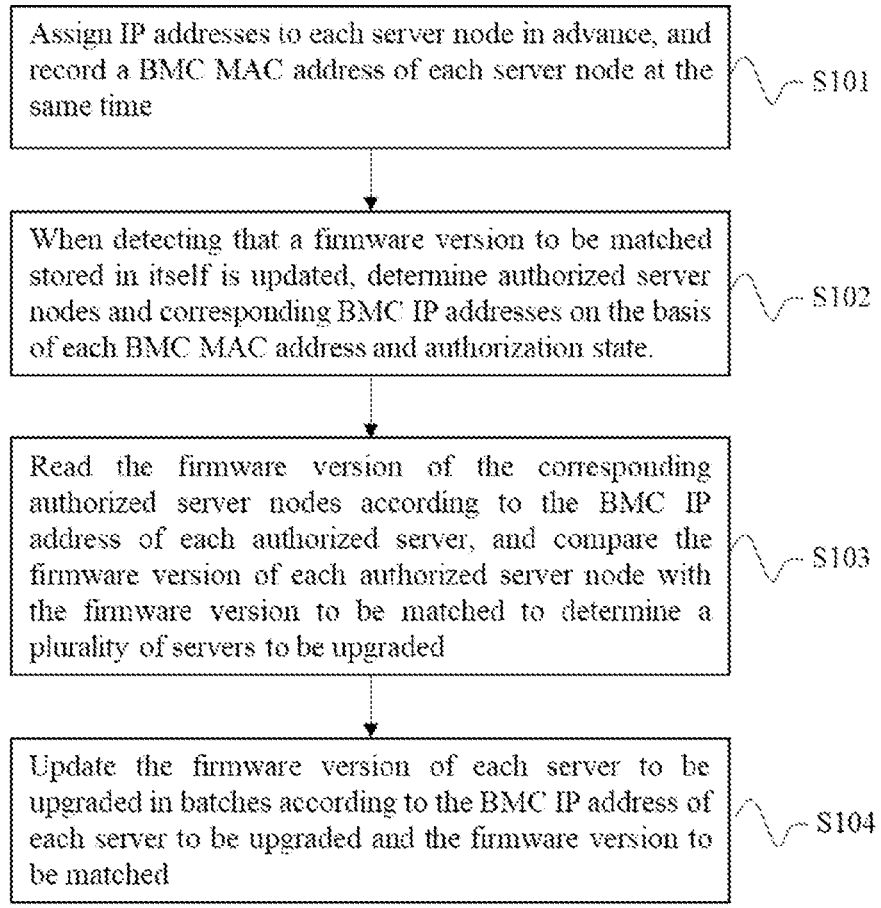
FIG. 1 is a flow diagram of a method for remotely updating firmware in batches provided by embodiments of the present application.
FIG. 2 is a schematic diagram of a BMC IP address reading result of a schematic example provided by embodiments of the present application.

First refer to FIG. 1, which is a flow chart of a method for remotely updating firmware in batches provided by an embodiment of the present application. The embodiment of the present application may include the following content.

S101: assign IP addresses to each server node in advance, and record a BMC MAC address of each server node at the same time.

The present application is suitable for updating firmware versions of server nodes connected with a DHCP server. That is, before executing the technical solutions of the present application, BMCs of server nodes such as all servers in a laboratory with firmware versions to be updated in batches are required to have access to a network in advance, and the BMC medium access control (MAC) address of each server node is unique, and is connected into the same dynamic host configuration protocol (DHCP) server. The same DHCP server executes version updating on all the server nodes connected with the DHCP server. After all the BMCs of the server nodes are connected to the DHCP server, the DHCP server automatically assigns IP addresses for the server nodes. An IP address file can be created in advance to store the IP addresses of the server nodes. For example, an IP address file of dhcpd.leases can be created in advance, which is stored in/var/lib/dhcpd/T, and the IP addresses can be obtained by reading/var/lib/dhcpd/dhcpd.leases. On the basis of the uniqueness of BMC MAC, BMC IP addresses can be queried on the basis of the MAC addresses in the DHCP server. BMC IPs of all servers in the current local area network can be identified, so the BMC MAC addresses of each server node can be recorded into the DHCP server. For example, a basic file for storing the BMC MAC address of each server node can be created in a Linux DHCP server in advance to serve as a unique identifier for managing each server node in a server cluster.

S102: when detecting that a firmware version to be matched stored in itself is updated, determine authorized server nodes and corresponding BMC IP addresses on the basis of each BMC MAC address and authorization state.

In the present application, a firmware version storage file for storing firmware versions, such as BIOS software versions, can be created locally in the DHCP server in advance. In order to facilitate reading and judging whether the firmware version in the firmware version storage file is updated or not without occupying too much space capacity of the server, the space capacity utilization rate of the server is improved, the firmware version in the firmware version storage file is stored in an overlay mode, and the latest firmware version is stored in the firmware version storage file. When a plurality of firmware versions are stored in the firmware version storage file, whether the firmware versions are updated or not can be judged based on the storage time of each firmware version. When only the latest firmware version is stored in the firmware version storage file, whether the firmware versions are updated or not can be judged based on the comparison between the storage time of the latest firmware version and the storage time of the firmware version read at the last moment. Whether the firmware versions are updated can also be judged by reading image names of the firmware versions.

The DHCP server in the embodiment of the application can detect whether the version is updated at regular time, for example, every 24 h, and can detect once when the server is started up every time. That is, in one implementation mode, if a current moment is a preset detection period arrival moment, reading an image name of a current firmware version in a firmware version storage file; if the mirror name is different from a mirror name read last time, outputting prompt information of firmware version updating, and taking the current firmware version as the firmware version to be matched. In another implementation, when detecting that a system is started, reading an image name of a current firmware version in a firmware version storage file; and if the mirror name is different from a mirror name read last time, outputting prompt information of firmware version updating, and taking the current firmware version as the firmware version to be matched.

After assigning IP addresses to each server node and recording the MAC address of the BMC of each server node in S101, the corresponding IP addresses may be determined based on the MAC address of the BMC. It can be understood that some server nodes are not connected to the DHCP server, or the server nodes are not in the lease period of the DHCP server. Then the DHCP server has no authority to perform any operation on the server nodes. If the IP address information and the BMC address information recorded in S101 are not updated in time, resources are wasted in performing subsequent operations on the server node. Before determining the server node to be upgraded, it may be determined whether the IP address is valid based on the authorization status of each server node. For example, as shown in FIG. 2, first, a/var/lib/dhcpd/dhcpd.leaves file is read, according to the BMC MAC address recorded by the server, a lease IP <192.168.0.99> is queried in the dhcpd.leaves file, a binding state (binding state) under the lease IP is queried, and if the binding state is an authorized state active, it indicates that the server node corresponding to the IP address is an authorized server node in a lease.

S103: read the firmware version of the corresponding authorized server nodes according to the BMC IP address of each authorized server, and compare the firmware version of each authorized server node with the firmware version to be matched to determine a plurality of servers to be upgraded.

After determining the authorized server nodes and the corresponding IP addresses in S102, the corresponding firmware version may be read by using the BMC based on the IP address. For example, the BIOS version of the server nodes may be read by ipmitool, and it is automatically determined whether the version is the same as the version of the firmware to be matched in the S102 firmware version storage file. If the two versions are different, the corresponding server node is the server to be upgraded, and if the two versions are the same, the corresponding server node is not the server to be upgraded.

S104: update the firmware version of each server to be upgraded in batches according to the BMC IP address of each server to be upgraded and the firmware version to be matched.

After the server nodes needing to be upgraded are determined in S103, the DHCP server may randomly and sequentially update the remote firmware versions of the server nodes, and may also sequentially update the remote firmware versions of the server nodes according to the MAC address entry time, which do not affect the implementation of the present application.

In the technical solutions provided by embodiments of the present application, the DHCP server determines the BMC IP addresses of the currently-connected server nodes on the basis of log analysis and according to the feature of the uniqueness of BMC MAC, reads firmware version information of the server nodes through the BMC IP addresses, and automatically compares the firmware version with a firmware version locally stored by the DHCP server to judge whether upgrading is needed, so that automatic batch updating and upgrading of server firmware are realized. The whole updating process does not require manual intervention, BMC IPs do not need to be known in advance, and MAC addresses only need to be recorded once; and it is only needed to update local mirrors of the DHCP server once firmware versions need to be upgraded in the follow-up process, so that operation is simple and easy to implement. It completely liberates the human input, effectively improves the update efficiency of the server cluster firmware version, and reduces the version update cost.

Figure 3:
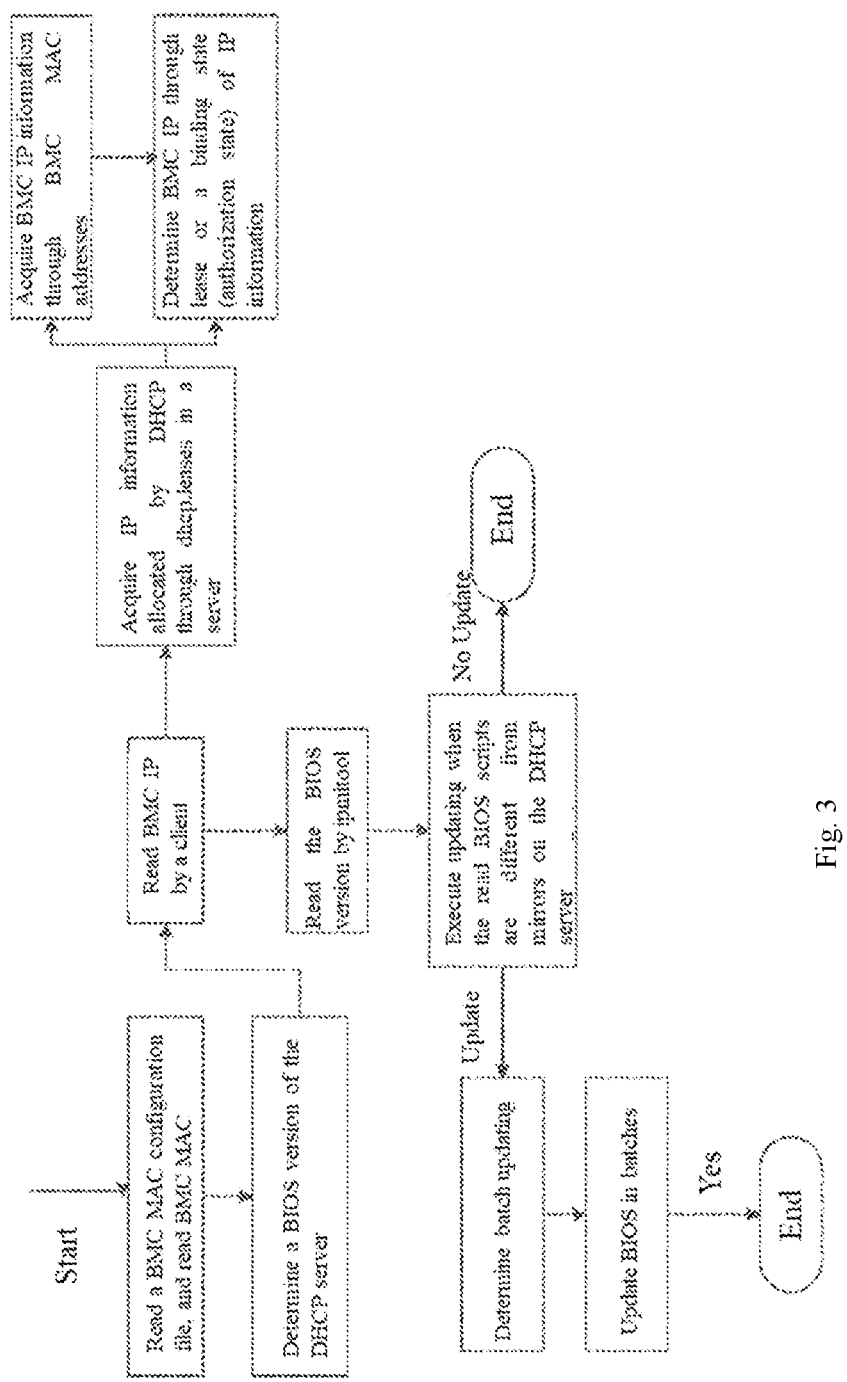
FIG. 3 is a flow diagram of another method for remotely updating firmware in batches provided by embodiments of the present application.

In the above embodiment, there is no limitation on how to perform step S102. This embodiment provides a method for determining IP addresses, as shown in FIG. 3, which may include the following steps:

Set a state code in the MAC IP address of each server node in advance, wherein the status code indicates that the DHCP server is authorized to process service of the server node. The state code, for example, may be active or inactive, active shows an authorization state, and inactive shows an unauthorized state.

Acquire the IP address file storing the assigned IP address information of each server node.

For each server node, read the BMC IP address of a current server node from the IP address file based on the BMC MAC address of the current server node.

if the state code of the BMC IP address of the current server node is an authorized state, the current server node being an authorized server node; and if the state code of the BMC IP address of the current server node is an unauthorized state, the current server node not being the authorized server node.

In some implementations of the embodiments of the present application, in order to improve the update efficiency of the firmware version, a plurality of address reading threads are called, and the same number of target server nodes are selected as the address reading threads; the BMC IP addresses of the corresponding target server nodes are simultaneously read from the IP address file based on the BMC MAC addresses of each server node and by means of each address reading thread. Under the condition that computing resources of the DHCP server are not limited, that is, the operation of the DHCP server at a normal temperature is not affected, the address reading threads with the number the same as the total number of server nodes to be updated in batches may be called, each address reading thread correspondingly processes one server node, and thus the IP addresses of all the server nodes can be simultaneously read.

After the IP addresses of the server nodes are read, each address reading thread can also respectively read the state code of the corresponding IP address, then the result of whether the address reading thread is an authorized server node is output. The DHCP server obtains all the authorized server nodes and the corresponding IP addresses thereof by summarizing the output results of all the address reading threads, thereby further effectively improving the whole version updating efficiency.

It can be understood that after the servers to be upgraded is determined in S103, some servers to be upgraded may be running an uninterruptible service, and the version upgrade may inherently affect the running of the service, which may result in a failure in running the service if the server node is directly updated. Still other server nodes may not have the condition for performing version updating immediately, and version updating executed prematurely may not be successful, resulting in inefficient version updating. In view of this, as another optional implementation, with reference to FIG. 3, S104 may also include:

Send an instruction of firmware version updating to each server to be upgraded, and determine candidate servers to be upgraded which receive an updating operation executing request within a preset time period such as 5 seconds. Of course, in another implementation, the DHCP server may also send a request for whether to perform version updating, where the request may be presented on a server node interface in a pop-up window manner. An operator performs feedback based on the actual situation of the current server node, and the DHCP server determines whether to perform updating according to the received feedback information.

Acquire priority information of each candidate server to be upgraded.

Sequentially perform firmware version updating on each candidate server to be upgraded in order from high to low according to the priority, based on the BMC IP address of each candidate server to be upgraded and the firmware version to be matched.

The embodiments of the present application effectively improve the updating efficiency of the firmware version and ensure the normal and stable operation of each server node by ensuring that the updating operation of the firmware version is executed under the condition that the operation environment of the server node is updatable.

It should be noted that, in the present application, there is no strict sequential execution order among the steps, and as long as the logical order is met, the steps may be executed simultaneously or according to a certain preset order, and FIG. 1 and FIG. 3 are only schematic manners, and do not represent that only such an execution order is available.

The embodiments of the present application also provide a corresponding apparatus for the method for remotely updating the firmware in batches, and the method has higher practicability by progress. Wherein the apparatus may be described separately from a functional module of view and a hardware point of view. In the following, the apparatus for remotely updating firmware in batches according to the embodiments of the present application is introduced. The apparatus for remotely updating firmware in batches described below and the method for remotely updating firmware in batches described above may be referred to correspondingly.

Figure 4:
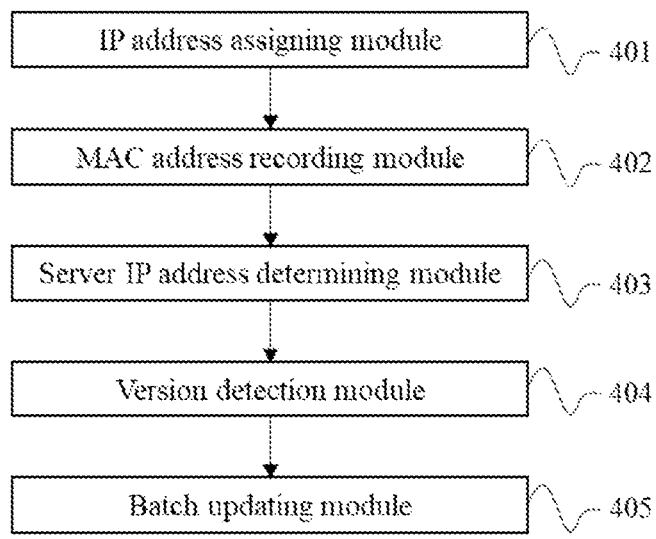
FIG. 4 is a structural diagram of one specific implementation of an apparatus for remotely updating firmware in batches provided by embodiments of the present application.

Based on the angle of the functional module, referring to FIG. 4, which is a structural diagram of the apparatus for remotely updating firmware in batches according to an embodiment of the present application. In a specific embodiment, where the apparatus is applied to a DHCP server connected to each server node BMC, and the apparatus may include:

- an IP address assigning module 401, configured to assign IP addresses to each server node in advance;
- a MAC address recording module 402, configured to record the BMC MAC address of each server node;
- a server IP address determining module 403, configured to determine authorized server nodes and corresponding BMC IP addresses on the basis of each BMC MAC address and authorization state, when detecting that a firmware version to be matched stored in itself is updated;
- a version detection module 404, configured to read the firmware version of the corresponding authorized server nodes according to the BMC IP address of each authorized server, and compare the firmware version of each authorized server node with the firmware version to be matched to determine a plurality of servers to be upgraded;
- a batch updating module 405, configured to update the firmware version of each server to be upgraded in batches according to the BMC IP address of each server to be upgraded and the firmware version to be matched.

Optionally, in some implementations of the embodiment, the server IP address determining module 403 may include:

- a state code presetting submodule, configured to set a state code in the MAC IP address of each server node in advance, the state code indicating that the DHCP server is authorized to process service of the server node;
- a file acquiring submodule, configured to acquire the IP address file storing the assigned IP address information of each server node;
- an IP address reading submodule, configured to for each server node, read the BMC IP address of a current server node from the IP address file on the basis of the BMC MAC address of the current server node; and
- an authorized server node determining submodule, configured to take the current server node as an authorized server node if the state code of the BMC IP address of the current server node is the authorized state;
- and not to take the current server node as the authorized server node if the state code of the BMC IP address of the current server node is an unauthorized state.

In some implementations of the embodiment of the present application, the IP address reading submodule may also be specifically configured to:

- calling a plurality of address reading threads, and selecting the same number of target server nodes as the address reading threads;
- simultaneously reading the BMC IP addresses of the corresponding target server nodes from the IP address file based on the BMC MAC addresses of each server node and by means of each address reading thread.

Optionally, in other implementations of the embodiment, the server IP address determining module 403 may include, for example:

- a periodic detection submodule, configured to, if a current moment is a preset detection period arrival moment, read an image name of a current firmware version in a firmware version storage file; if the mirror name is different from a mirror name read last time, output prompt information of firmware version updating, and taking the current firmware version as the firmware version to be matched.
- a self-detection starting module, configured to, when detecting that a system is started, read an image name of a current firmware version in a firmware version storage file; and if the mirror name is different from a mirror name read last time, output prompt information of firmware version updating, and taking the current firmware version as the firmware version to be matched.

As another optional implementation, the batch updating module 405, for example, may include:

- a candidate to-be-upgraded server determining submodule, configured to send an instruction of firmware version updating to each server to be upgraded, and determining candidate servers to be upgraded which receive an updating operation executing request within a preset time period;
- a priority information acquiring submodule, configured to acquire priority information of each candidate server to be upgraded;
- an updating submodule, configured to sequentially perform firmware version updating on each candidate server to be upgraded in order from high to low according to the priority, based on the BMC IP address of each candidate server to be upgraded and the firmware version to be matched.

The functions of each functional module of the apparatus for remotely updating firmware in batches of the embodiment of the present application may be realized according to the methods in the above method embodiments, and the specific realization process of the functions may refer to relevant descriptions of the above method embodiments, which is not repeated here.

It can be known from the above that by means of the embodiments of the present application, automatic batch updating and upgrading of server firmware are realized, the whole updating process does not require manual intervention, BMC IPs do not need to be known in advance, and operation is simple and easy to implement.

Figure 5:
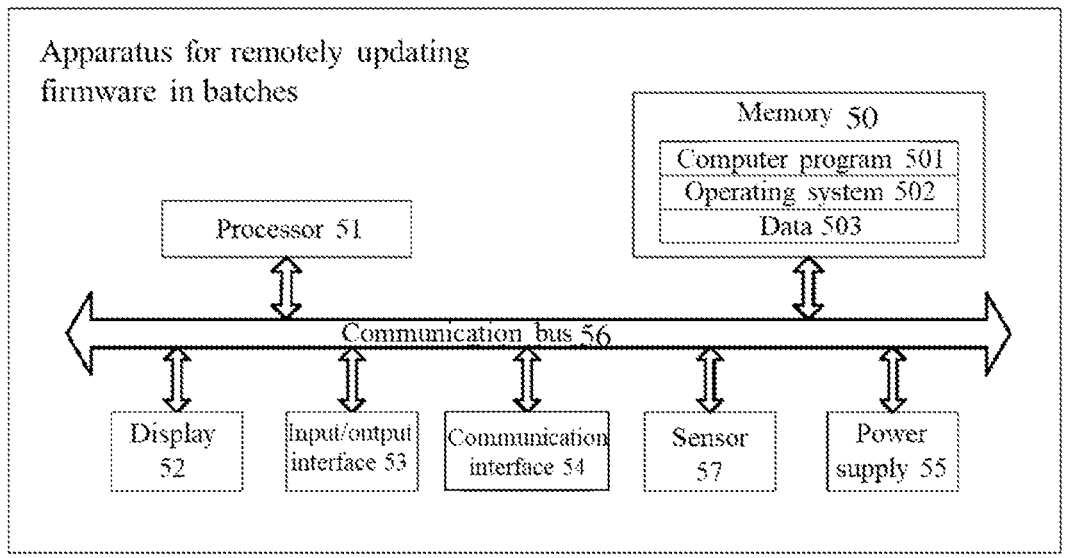
FIG. 5 is a structural diagram of another specific implementation of an apparatus for remotely updating firmware in batches provided by embodiments of the present application.

The apparatus for remotely updating firmware in batches provided above is described from the perspective of the functional modules, and furthermore, the present application further provides apparatus for remotely updating firmware in batches described from the perspective of hardware. FIG. 5 is a structural diagram of another apparatus for remotely updating firmware in batches provided by an embodiment of the present application. As shown in FIG. 5, the apparatus comprises a memory 50, configured to store a computer program; and a processor 51, configured to realize the steps of the method for remotely updating firmware in batches provided by any of the above embodiments when executing the computer program.

The processor 51 may include one or more processing cores, such as a four-core processor and an eight-core processor. The processor 51 may be implemented as at least one hardware form among Digital Signal Processing (DSP), Field-Programmable Gate Array (FPGA), and Programmable Logic Array (PLA). The processor 51 may also include a main processor and a coprocessor, where the main processor is a processor for Processing data in a wake state, and is also called a Central Processing Unit (CPU); a coprocessor is a low power processor for processing data in a standby state. In some embodiments, the processor 51 may be integrated with a Graphics Processing Unit (GPU), which is responsible for rendering and drawing the content required to be displayed on the display screen. In some embodiments, the processor 51 may further include an Artificial Intelligence (AI) processor for processing a calculation operation related to machine learning.

Memory 50 may include one or more computer-readable storage medium, which may be non-transitory. The memory 50 may also include a high-speed random access memory, and a non-volatile memory such as one or more magnetic disk storage apparatuses and flash memory apparatuses. In this embodiment, the memory 50 is at least used for storing the following computer program 501, wherein after being loaded and executed by the processor 51, the computer program can implement the relevant steps of the method for remotely updating firmware in batches as disclosed in any of the foregoing embodiments. In addition, the resources stored in the memory 50 may also include an operating system 502, data 503, and the like, and the storage manner may be a transient storage manner or a permanent storage manner. Operating system 502 may include Windows, Unix, Linux, and the like. Data 503 may include, but is not limited to, data corresponding to test results, and the like.

In some embodiments, the means for remotely updating firmware in batches may further include a display 52, an input/output interface 53, a communication interface 54, a power supply 55, and a communication bus 56.

Those skilled in the art will appreciate that the configuration shown in FIG. 5 does not constitute a limitation on the means for remotely bulk updating firmware, and may include more or fewer components than those shown, such as sensors 57.

The functions of each functional module of the apparatus for remotely updating firmware in batches of the embodiment of the present application may be realized according to the methods in the above method embodiments, and the specific realization process of the functions may refer to relevant descriptions of the above method embodiments, which is not repeated here.

It can be known from the above that by means of the embodiments of the present application, automatic batch updating and upgrading of server firmware are realized, the whole updating process does not require manual intervention, BMC IPs do not need to be known in advance, and operation is simple and easy to implement.

It is understood that, if the method for remotely updating firmware in batches in the above embodiment is implemented in the form of software functional units and sold or used as independent products, the method can be stored in a computer-readable storage medium. Based on such an understanding, the technical solution of the present application, in essence or in part contributing to the related art or in part, may be embodied in the form of a software product. The computer software product is stored in a storage medium to perform all or part of the steps of the method in each embodiment of the present application. And the aforementioned storage medium includes: a U disk, a removable hard disk, a Read-Only Memory (ROM), a Random Access Memory (RAM), an electrically erasable programmable ROM, a register, a hard disk, a removable magnetic disk, a CD-ROM, a magnetic disk, or an optical disk.

Based on this, embodiments of the present application further provide a computer-readable storage medium, which stores a program for remotely updating firmware in batches, which when executed by a processer, implements the steps of the method for remotely updating firmware in batches as described in any preceding embodiments.

The functions of each functional module of the computer-readable storage medium of the embodiment of the present application may be realized according to the method in the above method embodiments, and the specific realization process of the functions may refer to relevant descriptions of the above method embodiments, which is not repeated here.

It can be known from the above that by means of the embodiments of the present application, automatic batch updating and upgrading of server firmware are realized, the whole updating process does not require manual intervention, BMC IPs do not need to be known in advance, and operation is simple and easy to implement.

All the embodiments in this specification are described in a progressive manner. Contents mainly described in each embodiment are different from those described in other embodiments. Same or similar parts of all the embodiments refer to each other. For the apparatus disclosed in the embodiments, since it corresponds to the method disclosed in the embodiments, the description is relatively simple, and the relevant part can be referred to the description of the method part.

The skilled person may further realize that the units and algorithmic steps of each example described in conjunction with the embodiments disclosed herein are capable of being implemented in electronic hardware, computer software, or a combination of both, and that the composition and steps of each example have been described generally by function in the above description for the purpose of clearly illustrating the interchangeability of hardware and software. Whether these functions are performed in hardware or software depends on the particular application and design constraints of the technical solution. The skilled person may use different methods to implement the described functions for each particular application, but such implementation should not be considered as going beyond the scope of the present application.

The method and apparatus for remotely updating firmware in batches, and the computer-readable storage medium provided by the present application are introduced in detail above. Specific examples are applied in this specification to illustrate the principle and embodiments of the present application, and the above description of the embodiments is only used to help understand the method of the present application and the core idea thereof. It should be noted that for a person of ordinary skill in the art, several improvements and modifications can be made to the present application without departing from the principle of the present application, and these improvements and modifications also fall within the scope of protection of the claims of the present application.

The invention claimed is:

1. A method for remotely updating firmware in batches, wherein the method is applied to a dynamic host configuration protocol (DHCP) server connected with a Baseboard Management Controller (BMC) of each server node, and comprises:

assigning internet protocol (IP) addresses to each server node in advance, and recording a BMC media access control (MAC) address of each server node at the same time;

when a firmware version to be matched stored in the DHCP server is updated, determining authorized server nodes and corresponding BMC IP addresses on the basis of each BMC MAC address and authorization state;

reading the firmware version of the corresponding authorized server nodes according to the BMC IP address of each authorized server, and comparing the firmware version of each authorized server node with the firmware version to be matched to determine a plurality of servers to be upgraded; and updating the firmware version of each server to be upgraded in batches according to the BMC IP address of each server to be upgraded and the firmware version to be matched.

2. The method for remotely updating the firmware in batches according to claim 1, wherein the determining authorized server nodes and corresponding BMC IP addresses on the basis of each BMC MAC address and authorization state comprises:
   setting a state code in a MAC IP address of each server node in advance, the state code indicating that the DHCP server is authorized to process service of the server node;
   acquiring an IP address file storing the assigned IP addresses of each server node;
   for each server node, reading the BMC IP address of a current server node from the IP address file based on the BMC MAC address of the current server node; and
   in response to the state code of the BMC IP address of the current server node being an authorized state, determining the current server node as an authorized server node; and in response to the state code of the BMC IP address of the current server node being an unauthorized state, determining the current server node as not the authorized server node.

3. The method for remotely updating firmware in batches according to claim 2, wherein the for each server node, reading the BMC IP address of a current server node from the IP address file based on the BMC MAC address of the current server node comprises:
   calling a plurality of address reading threads, and selecting a same number of target server nodes as the address reading threads; and
   simultaneously reading the BMC IP addresses of the corresponding target server nodes from the IP address file based on the BMC MAC addresses of each server node and by means of each address reading thread.

4. The method for remotely updating firmware in batches according to claim 3, wherein the detecting that a firmware version to be matched stored in the DHCP server is updated comprises:
   in response to a current moment being a preset detection period arrival moment, reading an image name of a current firmware version in a firmware version storage file; and
   in response to the image name being different from an image name read last time, outputting prompt information of firmware version updating, and taking the current firmware version as the firmware version to be matched.

5. The method for remotely updating firmware in batches according to claim 3, wherein the detecting that a firmware version to be matched stored in the DHCP server is updated comprises:
   in response to detecting that a system is started, reading an image name of a current firmware version in a firmware version storage file; and
   in response to the image name being different from an image name read last time, outputting prompt information of firmware version updating, and taking the current firmware version as the firmware version to be matched.

6. The method for remotely updating firmware in batches according to claim 1, wherein the updating the firmware version of each server to be upgraded in batches according to the BMC IP address of each server to be upgraded and the firmware version to be matched comprises:
   sending an instruction of firmware version updating to each server to be upgraded, and determining candidate servers to be upgraded which receive an updating operation executing request within a preset time period;
   acquiring priority information of each candidate server to be upgraded; and
   sequentially performing firmware version updating on each candidate server to be upgraded in order from high to low according to the priority information, based on the BMC IP address of each candidate server to be upgraded and the firmware version to be matched.

7. An apparatus for remotely updating firmware in batches, comprising a processor, configured to implement the steps of a method for remotely updating firmware in batches when executing a computer program stored in a memory;
   wherein the method for remotely updating firmware in batches comprises:
      assigning internet protocol (IP) addresses to each server node in advance, and recording a Baseboard Management Controller (BMC) media access control (MAC) address of each server node at the same time;
      in response to detecting that a firmware version to be matched stored in a dynamic host configuration protocol (DHCP) server is updated, determining authorized server nodes and corresponding BMC IP addresses on the basis of each BMC MAC address and authorization state;
      reading the firmware version of the corresponding authorized server nodes according to the BMC IP address of each authorized server, and comparing the firmware version of each authorized server node with the firmware version to be matched to determine a plurality of servers to be upgraded; and
      updating the firmware version of each server to be upgraded in batches according to the BMC IP address of each server to be upgraded and the firmware version to be matched.

8. A non-transitory computer-readable storage medium, wherein the non-transitory computer-readable storage medium has a program for remotely updating firmware in batches stored thereon, which when executed by a processer, causes the processer to implement the steps of a method for remotely updating firmware in batches;
   wherein the method for remotely updating firmware in batches comprises:
      assigning internet protocol (IP) addresses to each server node in advance, and recording a Baseboard Management Controller (BMC) media access control (MAC) address of each server node at the same time;
      in response to detecting that a firmware version to be matched stored in the dynamic host configuration protocol (DHCP) server is updated, determining authorized server nodes and corresponding BMC IP addresses on the basis of each BMC MAC address and authorization state;
      reading the firmware version of the corresponding authorized server nodes according to the BMC IP address of each authorized server, and comparing the firmware version of each authorized server node with the firmware version to be matched to determine a plurality of servers to be upgraded; and
      updating the firmware version of each server to be upgraded in batches according to the BMC IP address of each server to be upgraded and the firmware version to be matched.

9. The method for remotely updating firmware in batches according to claim 2, wherein the updating the firmware version of each server to be upgraded in batches according to the BMC IP address of each server to be upgraded and the firmware version to be matched comprises:
sending an instruction of firmware version updating to each server to be upgraded, and determining candidate servers to be upgraded which receive an updating operation executing request within a preset time period;
acquiring priority information of each candidate server to be upgraded; and
sequentially performing firmware version updating on each candidate server to be upgraded in order from high to low according to the priority information, based on the BMC IP address of each candidate server to be upgraded and the firmware version to be matched.

10. The method for remotely updating firmware in batches according to claim 3, wherein the updating the firmware version of each server to be upgraded in batches according to the BMC IP address of each server to be upgraded and the firmware version to be matched comprises:
sending an instruction of firmware version updating to each server to be upgraded, and determining candidate servers to be upgraded which receive an updating operation executing request within a preset time period;
acquiring priority information of each candidate server to be upgraded; and
sequentially performing firmware version updating on each candidate server to be upgraded in order from high to low according to the priority information, based on the BMC IP address of each candidate server to be upgraded and the firmware version to be matched.

11. The apparatus for remotely updating firmware in batches according to claim 7, wherein the determining authorized server nodes and corresponding BMC IP addresses on the basis of each BMC MAC address and authorization state comprises:
setting a state code in a MAC IP address of each server node in advance, the state code indicating that the DHCP server is authorized to process service of the server node;
acquiring an IP address file storing the assigned IP addresses of each server node;
for each server node, reading the BMC IP address of a current server node from the IP address file based on the BMC MAC address of the current server node; and
in response to the state code of the BMC IP address of the current server node being an authorized state, determining the current server node as an authorized server node; and in response to the state code of the BMC IP address of the current server node being an unauthorized state, determining the current server node as not the authorized server node.

12. The apparatus for remotely updating firmware in batches according to claim 11, wherein the for each server node, reading the BMC IP address of a current server node from the IP address file based on the BMC MAC address of the current server node comprises:
calling a plurality of address reading threads, and selecting a same number of target server nodes as the address reading threads; and
simultaneously reading the BMC IP addresses of the corresponding target server nodes from the IP address file based on the BMC MAC addresses of each server node and by means of each address reading thread.

13. The apparatus for remotely updating firmware in batches according to claim 12, wherein the detecting that a firmware version to be matched stored in the DHCP server is updated comprises:
in response to a current moment being a preset detection period arrival moment, reading an image name of a current firmware version in a firmware version storage file; and
in response to the image name being different from an image name read last time, outputting prompt information of firmware version updating, and taking the current firmware version as the firmware version to be matched.

14. The apparatus for remotely updating firmware in batches according to claim 12, wherein the detecting that a firmware version to be matched stored in the DHCP server is updated comprises:
in response to detecting that a system is started, reading an image name of a current firmware version in a firmware version storage file; and
in response to the image name being different from an image name read last time, outputting prompt information of firmware version updating, and taking the current firmware version as the firmware version to be matched.

15. The apparatus for remotely updating firmware in batches according to claim 7, wherein the updating the firmware version of each server to be upgraded in batches according to the BMC IP address of each server to be upgraded and the firmware version to be matched comprises:
sending an instruction of firmware version updating to each server to be upgraded, and determining candidate servers to be upgraded which receive an updating operation executing request within a preset time period;
acquiring priority information of each candidate server to be upgraded; and
sequentially performing firmware version updating on each candidate server to be upgraded in order from high to low according to the priority information, based on the BMC IP address of each candidate server to be upgraded and the firmware version to be matched.

16. The non-transitory computer-readable storage medium according to claim 8, wherein the determining authorized server nodes and corresponding BMC IP addresses on the basis of each BMC MAC address and authorization state comprises:
setting a state code in a MAC IP address of each server node in advance, the state code indicating that the DHCP server is authorized to process service of the server node;
acquiring an IP address file storing the assigned IP addresses of each server node;
for each server node, reading the BMC IP address of a current server node from the IP address file based on the BMC MAC address of the current server node; and
in response to the state code of the BMC IP address of the current server node being an authorized state, determining the current server node as an authorized server node; and in response to the state code of the BMC IP address of the current server node being an unauthorized state, determining the current server node as not the authorized server node.

17. The non-transitory computer-readable storage medium according to claim 16, wherein the for each server node, reading the BMC IP address of a current server node from the IP address file based on the BMC MAC address of the current server node comprises:

calling a plurality of address reading threads, and selecting a same number of target server nodes as the address reading threads; and simultaneously reading the BMC IP addresses of the corresponding target server nodes from the IP address file based on the BMC MAC addresses of each server node and by means of each address reading thread.

18. The non-transitory computer-readable storage medium according to claim 17, wherein the detecting that a firmware version to be matched stored in the DHCP server is updated comprises:

in response to a current moment being a preset detection period arrival moment, reading an image name of a current firmware version in a firmware version storage file; and in response to the image name being different from an image name read last time, outputting prompt information of firmware version updating, and taking the current firmware version as the firmware version to be matched.

19. The non-transitory computer-readable storage medium according to claim 17, wherein the detecting that a firmware version to be matched stored in the DHCP server is updated comprises:

in response to detecting that a system is started, reading an image name of a current firmware version in a firmware version storage file; and in response to the image name being different from an image name read last time, outputting prompt information of firmware version updating, and taking the current firmware version as the firmware version to be matched.

20. The non-transitory computer-readable storage medium according to claim 8, wherein the updating the firmware version of each server to be upgraded in batches according to the BMC IP address of each server to be upgraded and the firmware version to be matched comprises:

sending an instruction of firmware version updating to each server to be upgraded, and determining candidate servers to be upgraded which receive an updating operation executing request within a preset time period;

acquiring priority information of each candidate server to be upgraded; and sequentially performing firmware version updating on each candidate server to be upgraded in order from high to low according to the priority information, based on the BMC IP address of each candidate server to be upgraded and the firmware version to be matched.

* * * * *